Feb. 27, 1968  F. W. HAMILTON  3,370,488
THROTTLE SAFETY RETURN FOR TRANSMISSION FAILURE
Filed May 6, 1966  3 Sheets-Sheet 1
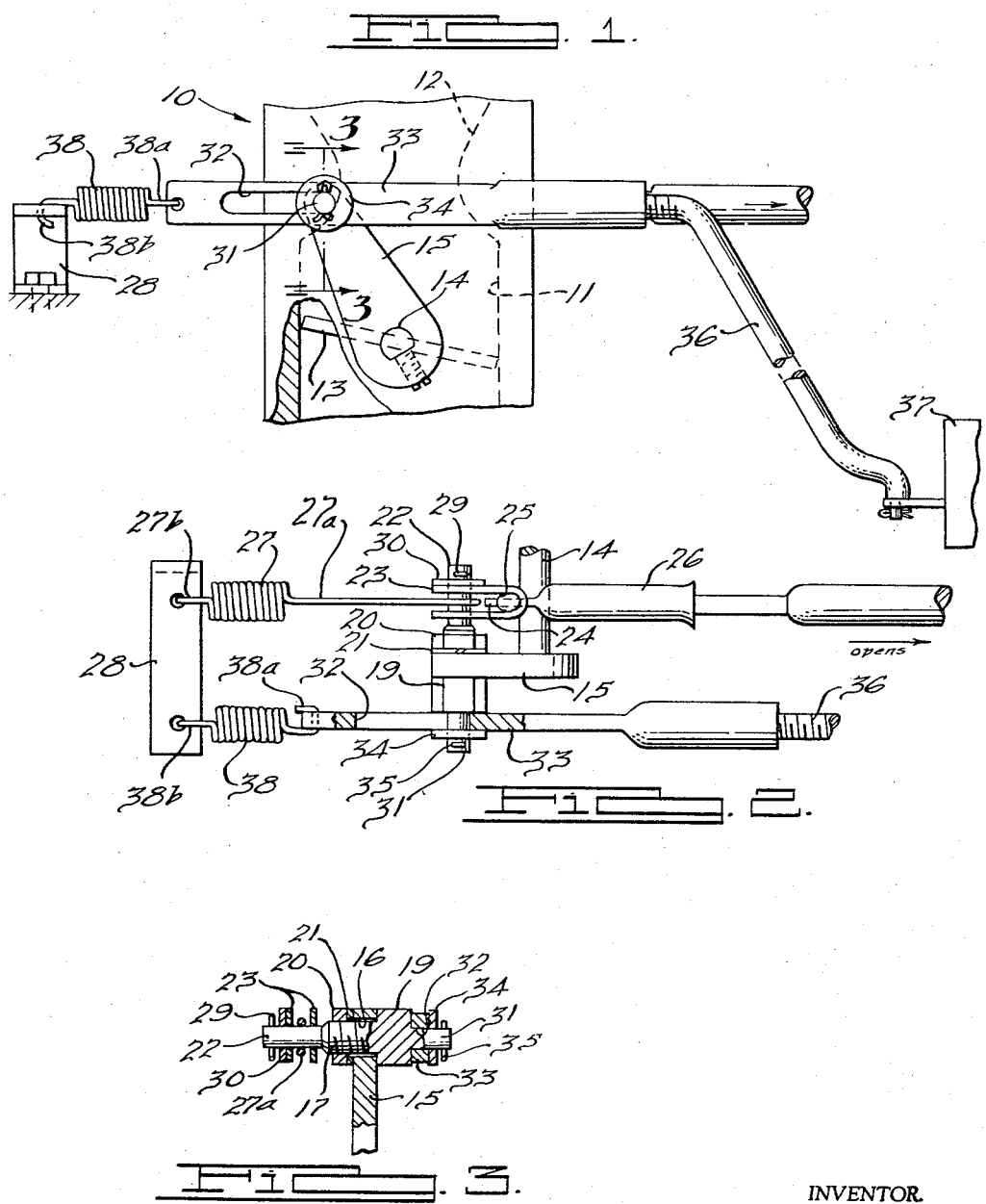
INVENTOR.
Francis W. Hamilton
BY
Harness & Harris
ATTORNEYS.

Feb. 27, 1968  F. W. HAMILTON  3,370,488
THROTTLE SAFETY RETURN FOR TRANSMISSION FAILURE
Filed May 6, 1966  3 Sheets-Sheet 2

INVENTOR.
Francis W. Hamilton
BY
Harness & Harris
ATTORNEYS.

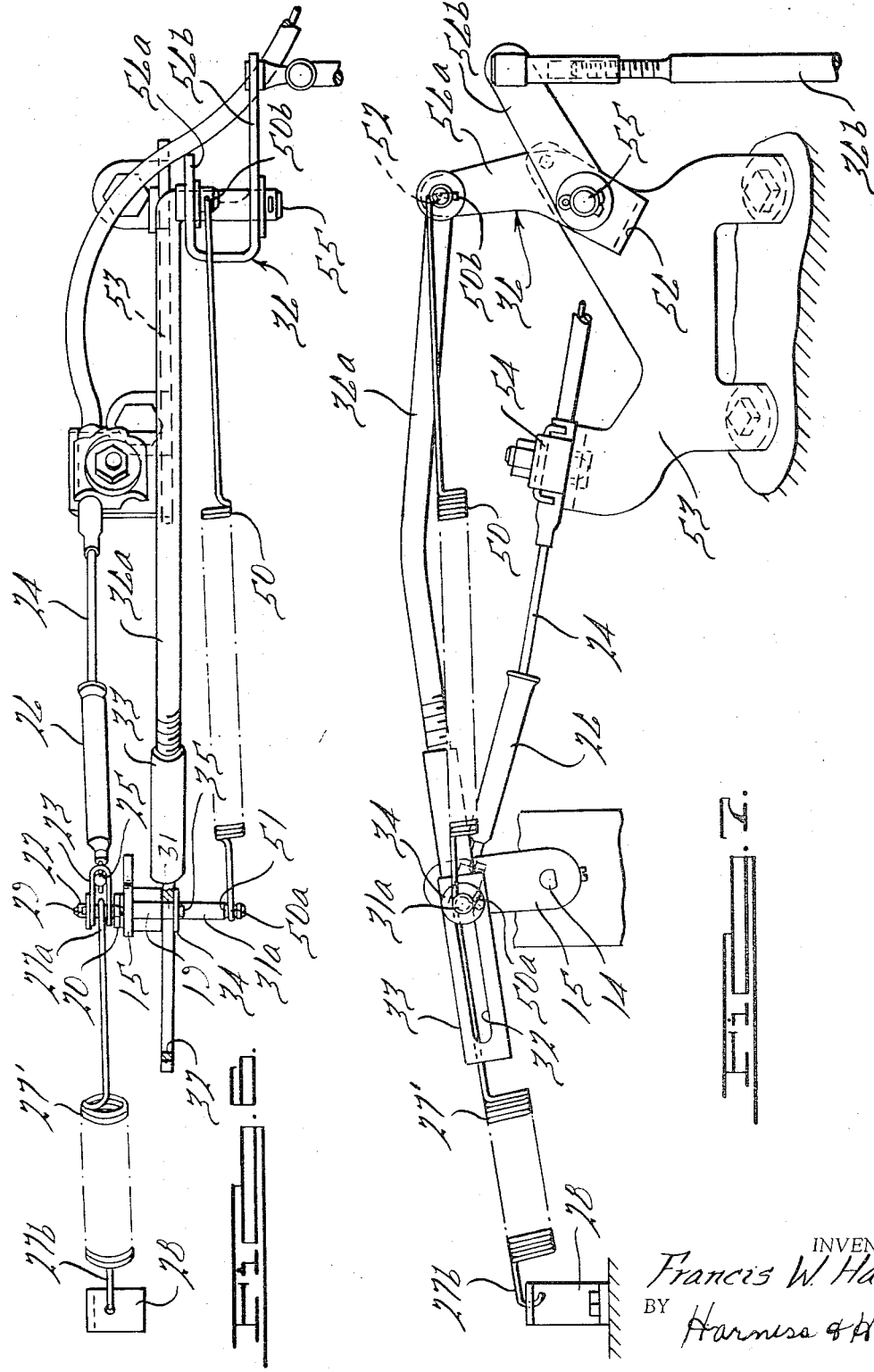

United States Patent Office 3,370,488
Patented Feb. 27, 1968

3,370,488
THROTTLE SAFETY RETURN FOR
TRANSMISSION FAILURE
Francis W. Hamilton, Southfield, Mich., assignor to
Chrysler Corporation, Highland Park, Mich., a
corporation of Delaware
Filed May 6, 1966, Ser. No. 548,226
6 Claims. (Cl. 74—865)

This invention relates to improvements in a throttle actuated transmission modulating device for automotive vehicles, particularly to improvements over applicant's co-pending application, Ser. No. 438,554, filed Mar. 10, 1965, now Patent No. 3,340,746.

Modern automobiles having an automatic transmission for varying the speed ratio between the engine and torque shaft, which is in driving engagement with the vehicle wheels, customarily provide means for modulating the transmission automatic shift mechanism in accordance with the engine load or wide-open throttle conditions. The greater the throttle opening during acceleration, the longer will the transmission stay in the lower speed ratios.

A serious objection to customary throttle actuated transmission modulating devices is that the transmission occasionally fails to function properly and release the modulating mechanism during acceleration, or the latter which is customarily located near the underside of the vehicle becomes clogged with dirt or frozen mud or slush and fails to release when the throttle is released to decelerate. By reason of the customary interconnection between the throttle and modulating mechanism, failure of the latter to release has also caused failure of the former to release and return to its idle position, occasionally resulting in a run-a-way automobile.

An object of the present invention is to provide an improved throttle actuated transmission modulating mechanism whereby in the event the modulating mechanism fails to release, as for example to its idle condition, the throttle mechanism will return independently to its idle or closed position.

Another object is to provide separate return spring means for returning both the throttle and transmission modulating mechanism to their idle positions, and to provide an interconnection between the modulating and throttle mechanism to return the latter to its idle position by means of the return spring for the transmission modulating mechanism in the event the throttle return spring should break.

Another and more specific object of the invention is to provide a throttle controlled transmission modulating and throttle mechanism wherein the pivotal shaft for the customary carburetor throttle valve extends exteriorly of the carburetor induction conduit and is splined at its outer end to one end of the crank arm, so that swinging of the crank arm will pivot the throttle valve to open and close the same. The radially outer swinging end of the crank arm is secured to a transverse bolt or shaft having its axis parallel to the axis of the valve shaft. One end of the transverse bolt is pivotally secured to a throttle linkage operable to swing the crank arm and open the throttle valve upon movement of the throttle linkage in one direction, whereas a throttle return spring yieldingly opposes such movement and urges the throttle valve to its closed or idle position.

The opposite end of the transverse bolt extends pivotally and slidable through a lost motion slot in a transmission modulating rod operably connected with the transmission to modulate the latter. A modulating return spring secured under tension to the modulating rod yieldingly urges the latter to the idle position to maintain said bolt at one end of said slot, such that upon swinging of the crank arm in the direction to open the throttle valve, the bolt will immediately engage the modulating rod at said one end of the slot to actuate said rod and modulate the transmission in accordance with the engine load. By virtue of this construction, operation of the throttle to increase the fuel flow operates the transmission modulating rod, whereas movement of the throttle to the closed or idle position independently of the modulating rod is permitted by means of the bolt sliding freely in the slot toward its other end, in the event the modulating rod fails to return to its idle position.

Another object is to provide such a construction wherein a crank arm is keyed to the throttle shaft to pivot therewith, and a pivotal lever is journaled on the throttle shaft adjacent the crank arm to pivot independently of the latter. The throttle return spring and throttle actuating linkage are connected to the outer swinging end of the crank arm to swing the same in throttle closing and opening directions respectively. The modulating mechanism and the latter's return spring are connected to the outer swinging end of the lever, the spring urging the lever in the direction that the crank arm swings to close the throttle, and the modulating mechanism being actuated by swinging of the lever. Interengaging means are also provided on the lever and crank arm in order to actuate the modulating mechanism upon opening of the throttle valve, which means are releasable from each other to allow return of the crank arm and throttle valve to their closed positions independently of the pivotal lever and transmission modulating linkage in the event of malfunction of the transmission or modulating mechanism.

Another object is to provide such a system wherein the two return springs for the throttle and modulating mechanism are arranged side-by-side, one radially outwardly of the other, in parallelism with each other and in a plane transverse to the pivot axis of the swinging lever and crank arm. One of the latter two members is appreciably longer than the other. In consequence the radially outer ends of these members can be readily secured to the radially arranged ends of their respective return springs to achieve optimum compactness and minimum friction and torque on the throttle shaft.

Another object is to provide a mechanism of the above character having an improved arrangement of springs for returning the throttle control and transmission modulating mechanisms to the idle condition, whereby a comparatively uniform throttle foot pedal feel is achieved throughout the throttle movement and where a comparatively positive and friction free return of the throttle to the idle condition is achieved in the event that the throttle modulating linkage fails to return to the idle condition.

Other objects of this invention will appear in the following description and appended claims, reference being had to the accompanying drawings forming a part of this specification wherein like reference characters designate corresponding parts in the several views.

FIGURE 1 is a fragmentary schematic view illustrating one embodiment of the invention;

FIGURE 2 is a fragmentary plan view illustration of FIGURE 1;

FIGURE 3 is a fragmentary sectional view taken in the direction of the arrows substantially along the line 3—3 of FIGURE 1;

FIGURES 6 and 7 are plan and side elevations respectively on another modification.

Figure 4:
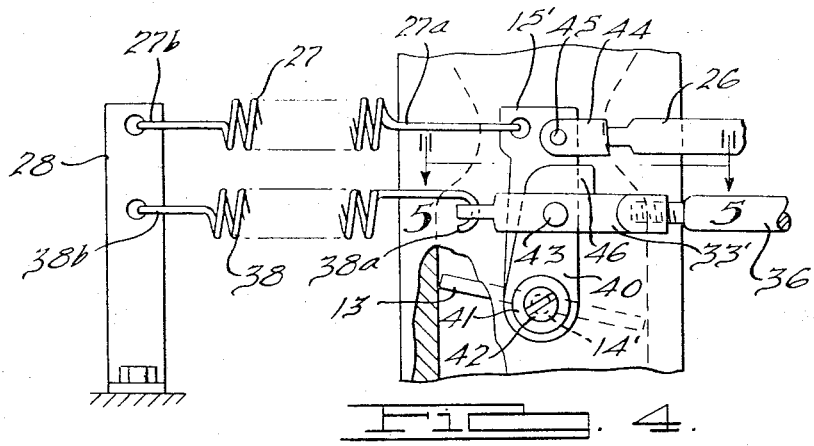
FIGURE 4 is a view similar to FIGURE 1, illustrating a modification of the invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the invention is illustrated by way of example in an application with an automotive vehicle wherein a fragmentary portion of the engine 10 is illustrated, including a fuel system which may comprise a conventional carburetor having the fuel induction conduit 11. The conduit 11 contains the usual venturi restriction 12, throttle valve 13 and the usual fuel supply ducts, not shown. Clean combustion supporting air enters the conduit 11 from above through the usual filter. Fuel is added to the air in its downward passage through conduit 11 and the fuel-air mixture is discharged from the lower end of the conduit into a fuel header which distributes the fuel-air mixture to the engine cylinders.

The throttle valve 13 is secured to a pivotal shaft 14 extending through the conduit 11 at a location downstream of the restriction 12 so as to open or close the conduit 11 upon clockwise or counterclockwise pivoting respectively of the shaft 14. The latter extends through the sidewall of the conduit 11 to the exterior of the engine fuel system and is splined to one end of a crank arm 15 to be pivoted upon swinging of the latter.

The outer swinging end of the crank arm 15 is provided with a hole 16, FIGURE 3, through which extends the threaded extension 17 of a bolt having an enlarged hexagonal head 19 abutting the crank arm 15. The enlarged head 19 is securely clamped to the crank arm 15 by the assembly of a nut 20 and washer 21, the nut 20 being screwed tightly on the threaded extension 17 toward crank arm 15 in opposition to the head 19. Leftward of the threaded portion 17 is an integral cylindrical extension 22 of reduced diameter on which is freely pivoted a U-shaped clevis 23.

The left end of a throttle control wire 24 extends through a hole in the U-base of the clevis 23 and is pivotally secured in position by a ball type clamping element 25 crimped tightly around the wire 24 within the clevis 23. The wire 24 extends rightwardly from the clevis 23 through a casing 26 to a foot pedal actuated throttle linkage so as to pull the extension 22 to the right in FIGURE 1 and swing the crank arm 15 clockwise to open throttle 13. The throttle wire 24 is maintained under tension at all times by a throttle closing spring 27 having its right end 27a looped freely over the extension 22 to enable relative rotation of the latter and having its left end 27b secured under tension to a fixed support 28, which may comprise part of the vehicle engine or frame. The clevis 23 is maintained on the extension 22 by means of a washer 30 and a cotter pin 29, which extends diametrically through the left end of extension 22, FIGURE 3.

Extending to the right of the enlarged head 19 is a reduced integral extension 31 which projects freely through a lost motion slot 32 in a transmission modulating rod 33. The rod 33 is maintained on the extension 31 by means of a washer 34 and a cotter pin 35, which extends diametrically through the right end of the extension 31.

As illustrated in FIGURE 1, the right end of the rod 33 is connected by a suitable linkage 36 with an automatic transmission 37 for the vehicle. The rod 33 is normally maintained to the left in FIGURES 1 and 2 by a return spring 38 having its right end 38a secured to the left end of rod 33 and its left end 38b secured under tension to the support 28. The automatic transmission 37 may be conventional and is automatically operative in accordance with engine speed to change the gear ratio between the vehicle engine and its torque shaft which drives the vehicle wheels.

In order to modulate the torque responsiveness of the transmission in accordance with the engine fuel demand or load, the modulating linkage 33–36 operates conjointly with the throttle valve 13. Thus when the throttle valve 13 is slightly open and the engine accelerates to a predetermined speed under comparatively low load, the transmission 37 will shift automatically to a higher gear ratio appropriate for the higher speed. In the event, however, the engine is operating at the same speed as before but the throttle is comparatively wide open, indicating that the engine is under considerable load, the transmission modulating linkage 33–36 will be shifted to the right so as to modulate the operation of the transmission 37 and maintain the latter in a lower gear ratio. The operative relationship between transmission 37 and its modulating linkage 33–36 may be conventional.

By virtue of the lost motion slot 32, when the throttle valve 13 is moved clockwise toward an open position, the bolt extension 22 will engage the rod 33 at the right end of the slot 32 and move the rod 33 rightward as required to its transmission modulating position. Thereafter during deceleration, in the event the transmission modulating linkage 33–36 should stick in its rightward position, as for example by reason of transmission malfunction or in consequence of freezing slush or mud collected around the lower end of the linkage 36, as occasionally happens, the extension 22 is free to ride along the slot 32 toward the latter's leftward end to enable return of the throttle valve 13 to its closed position. Thus, a situation of an inadvertent run-away vehicle is avoided.

Figure 5:
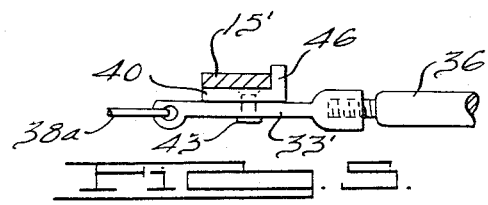
FIGURE 5 is a sectional view taken in the direction of the arrows substantially along the line 5—5 of FIGURE 4.

The modification illustrated in FIGURES 1–3 is conveniently adaptable for use with certain production fuel systems. FIGURES 4 and 5 show a similar arrangement which allows spring return of the throttle valve to the closed position independently of the transmission modulating mechanism, wherein corresponding parts are numbered the same. This construction is preferred where compactness and low friction are important considerations.

The fuel system including the pivotal shaft 14 and valve 13 may be identical to the system illustrated in FIGURE 1. However, the throttle shaft 14 is provided with a coaxial extension 14′ exteriorly of the conduit 11. A crank arm 15′ is splined onto extension 14′ similarly to the manner that the crank arm 15 is splined onto throttle shaft 14 in FIGURE 1. Pivotally coaxially with the throttle shaft 14 is a swinging throttle modulating lever 40 secured on the extension 14′ outwardly of the lever 15′ by means of a washer 41 and retaining screw 42. A modulating rod 33′, reciprocal in the manner of the rod 33 of FIGURES 1–3, is pivotally secured by a pin 43 to an upper swinging extension of the lever 40. The right end of the rod 33′ is secured to the linkage 36 for modulating the transmission 37 in the manner described above. The lever 40 is yieldingly urged counterclockwise by spring 38 having its end 38a secured within the left end of rod 33′.

In FIGURE 5, the left end of throttle wire 24 extends into and is confined within a retainer 44 pivotally secured at 45 to the upper end of lever 15′. The latter is yieldingly urged leftward or counterclockwise to the throttle closing position by spring 27 having its end 27a secured within a hole at the upper end of lever 15′. In order to actuate the modulating linkage 33′–36 upon opening of the throttle 13, an inbent flange 46 integral with the lever 40 extends across the right edge of the crank arm 15′. Thus upon clockwise swinging of crank arm 15′ to open throttle valve 13, lever 40 is likewise swung clockwise to move the transmission linkage 36 to the right as above described in regard to FIGURES 1–3. Throttle closing independently of movement of the modulating linkage is readily permitted by crank arm 15′ moving counterclockwise or leftward from the flange 46 in the event of transmission malfunction.

In the normal instance in either modification, the spring 38 will urge either rod 33 or 33' leftward in unison with throttle closing movement of the crank arm 15 or 15'. Accordingly, in the event the throttle return spring 27 should break, the transmission modulating spring 38 will serve as a safety spring and swing the crank arm 15 or 15', as the case may be, counterclockwise to the throttle closed position to prevent a running away situation. This latter operation is accomplished in FIGURE 1 by rod 33 engaging pin 22 at the right end of slot 32, upon leftward movement of rod 33, and is accomplished in FIGURE 4 by flange 46 engaging crank arm 15' upon leftward movement of rod 33'.

The structure illustrated in FIGURES 6 and 7 is similar to that of FIGURES 1 to 3, so that corresponding parts are numbered the same. The primary distinctions in FIGURES 6 and 7 are that spring 27 is replaced by a stronger spring 27' having a spring force in the closed throttle position equal to the combined forces of the springs 27 and 38 in parallel, that extension 31 is extended laterally at 31a beyond the cotter pin 35, and that spring 38 is replaced by a comparable spring 50 having approximately the same spring force at the throttle closed position.

The spring 50 comprises the return spring for the transmission modulating mechanism and has its left end 50a looped freely around an annular retainer groove 51 in the outer end of extension 31a, thereby to permit relative rotation of extension 31a with respect to the spring 50. The right end 50b of the latter spring is secured within a diametrically extending hole 52 in the laterally extending end of an extension 36a, which comprises a generally axial extension of rod 33 and part of the linkage 36 which connects the rod 33 with the automatic transmission 37.

FIGURES 6 and 7 also show the bracket 53 suitably secured to a portion of the vehicle engine or body structure and providing a support for a retainer 54 for the sheath within which the throttle wire 24 is slidable. The bracket 53 also carries the pivot 55 for a Y-type crank arm 56 having integral arms 56a and 56b pivotally connected at their outer ends to shaft extension 36a and to a transmission modulating shaft 36b, which in turn is operably connected with the transmission 37 to modulate the same in accordance with the throttle position as described above. In this regard, the arm 56a is pivoted on the laterally extending end of rod extension 36a and is retained in place by the spring end 50b, so that no cotter pin is required.

By virtue of the structure illustrated in FIGURES 6 and 7, only the spring 27' is effective to resist clockwise throttle opening movement of crank arm 15, the spring 50 being employed merely to hold the extension 31 at the right end of slot 32 during normal operation of the mechanism and to retract the transmission modulating linkage 36 upon counterclockwise throttle closing movement of crank arm 15. Thus in accordance with the well known characteristics of a single spring having the same spring force as two springs in parallel, the spring 27' will have a force at the throttle closed position approximately equal to the combined force of springs 27 and 38, but will have an appreciably lower spring rate than the spring rate of the combined parallel springs 27 and 38 (the spring rate being defined as the change in spring force per unit change in spring distortion) with the result of a more uniform accelerator foot pedal feel, as is highly desirable. The spring 50 is comparatively light with respect to spring 27', but has the same spring force as spring 38 at the throttle close position and for the reasons above will have a lower spring rate than that of spring 38.

Also by reason of the arm of movement of extension 31 upon operation of the throttle 13, the elimination of spring 38 in FIGURES 6 and 7 results in less binding and frictional resistance to leftward movement of extension 31 along the slot 32, during throttle return to the idle position as urged by spring 27' when the linkage 36 is stuck in the throttle open position, as compared to the structure of FIGURES 1 to 3 where the tensed spring 38 in the throttle open position subjects rod 33 to force causing frictional side loading of the latter against extension 31 and preventing free swinging movement thereof about the axis of shaft 14. In other words, the force of spring 50 is applied directly to the extension 31 and results in only nominal frictional obstruction to movement of that extension along slot 32, whereas the force of spring 38 is applied directly to rod 33, so as to resist vertical movement of the latter required by the vertical component of the swinging movement of extension 31.

I claim:

1. In an automotive vehicle, a fuel system having throttle means movable between open and closed positions, resilient means operably coupled with said throttle means for yieldingly urging closing of the latter, an automatic transmission for said vehicle having throttle actuated modulating means shiftable in one direction from a predetermined position for modulating the automatic operation of said transmission, a crank arm operatively coupled with said throttle means for swinging between open and closed positions upon corresponding movement of said throttle means, link means operatively connecting said crank arm and modulating means to shift the latter in said one direction from said predetermined position upon swinging of said crank arm in the direction from its closed position toward its open position and for releasing said crank arm for return to its closed position independently of return movement of said modulating means toward said predetermined position when said modulating means is restrained against said return movement during abnormal operation, said link means including a member having a lost motion slot therein, means pivotally connecting said crank arm and member comprising pivot means pivotally connecting said crank arm and member comprising pivot means connected with said crank arm to swing therewith and extending through said slot to ride therealong in the direction from one end thereof upon said return of said crank arm to its closed position independently of said return movement of said modulating means, and means for urging said member at said one end of said slot into abutment with said pivot means and yieldingly resisting relative movement of said pivot means along said slot in said direction from said one end to effect normal return movement of said modulating means upon said return of said crank arm to its closed position comprising second resilient means interconnecting said pivot means and member.

2. In the combination according to claim 1, said member having a portion extending from said one end of said slot in the direction generally opposite to the direction of extensions of said slot from said one end, and said second resilient means having one end connected under tension to said portion of said member.

3. In the combination according to claim 2, the other end of said second resilient means terminating in a loop extending around said pivot means to enable relative pivoting of the latter within said loop.

4. In the combination according to claim 2, said portion of said member having an element extending transversely to the direction of extension of said slot, said element having a retaining hole therein, said second resilient means having a portion confined within said hole to comprise the interconnection between said second resilient means and member, and said link means also including a second element pivotally mounted on the first named element at a location between said member and the portion of said second resilient means confined within said hole.

5. In the combination according to claim 2, said member comprising a rod having said slot extending longitudinally therein from said one end generally in the direction of swinging of said pivot means toward its closed position.

6. In the combination according to claim 5, the portion of said member extending from said slot generally opposite to the direction of extension of said slot from said one end comprising a portion of said rod terminating in a transverse extension having a retaining hole therein, said second resilient means having a portion confined within said hole to comprise the interconnection between said second resilient means and member, and said link means also including a second element pivotally mounted on said transverse extension between said rod and the portion of said second resilient means confined within said hole and being thereby retained in position on said transverse extension.

References Cited

UNITED STATES PATENTS

| 2,131,157 | 9/1938 | Almen, et al. | 74—472 |
| 2,611,281 | 9/1952 | Gray et al. | 74—472 |
| 2,977,816 | 4/1961 | Rice | 74—472 |
| 3,340,746 | 9/1967 | Hamilton | 74—472 |

DONLEY J. STOCKING, *Primary Examiner.*

H. S. LAYTON, *Assistant Examiner.*